Figure 1:
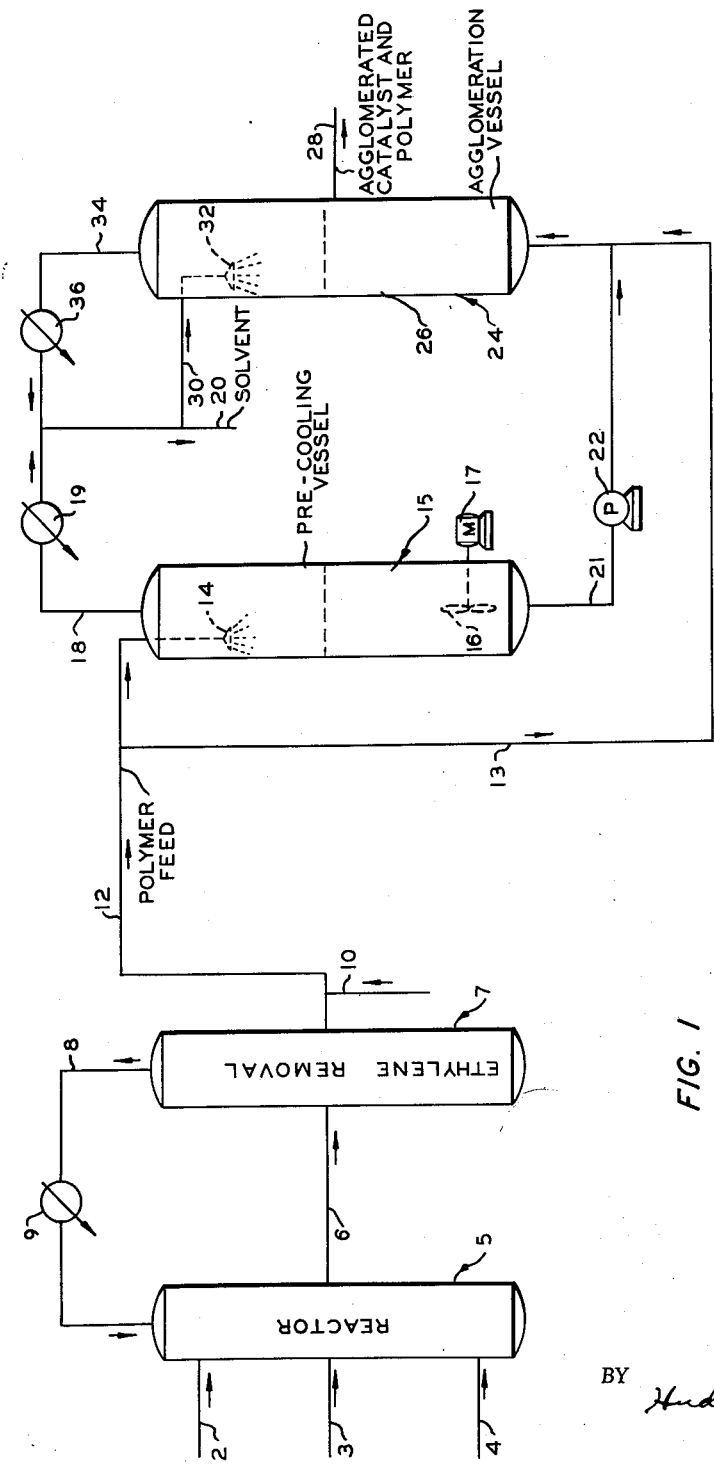

Nov. 14, 1961 W. L. STALDER 3,008,947
SOLIDS RECOVERY

Filed Dec. 28, 1956 2 Sheets-Sheet 2

INVENTOR.
W.L. STALDER
BY Hudson and Young
ATTORNEYS

United States Patent Office

3,008,947
Patented Nov. 14, 1961

3,008,947
SOLIDS RECOVERY
William L. Stalder, Bartlesville, Okla., assignor to Phillips Petroleum Company, a corporation of Delaware
Filed Dec. 28, 1956, Ser. No. 631,165
6 Claims. (Cl. 260—94.9)

This invention relates to the recovery of solids from a polymer solution. In one aspect it relates to the recovery of subdivided catalyst solids from a solution of solid olefin polymer by agglomerating said solids with precipitated polymer.

In certain methods of preparing solid polymers, such as polymers of ethylene, the reaction product is obtained as a solution of polymer in a solvent or diluent material and contains finely divided catalyst solids. Generally, it is desirable that the final polymer product be free of catalyst solids and it may further be desirable to recover the catalyst for reuse in the polymerization reaction. It has been found that recovery of the catalyst is facilitated by agglomerating the catalyst as described in the copending application of Hanson and Croley, Serial No. 572,310, filed March 19, 1956, now U.S. Patent 2,930,784 (March 29, 1960).

It is an object of this invention to provide an improved process for the recovery of solids from a polymer solution.

Another object of this invention is to provide an improved process for the recovery of catalyst solids from a polymer solution by agglomeration.

Still another object of this invention is to provide an improved process for the recovery of subdivided catalysts solids from a solution of solid ethylene polymer by agglomeration.

These and other objects of the invention will become more readily apparent from the following detailed description and discussion.

The foregoing objects are achieved broadly by reducing the temperature of a solids-containing polymer solution by autorefrigeration whereby the solids agglomerate and accumulate at the surface of said solution; and thereafter separating the agglomerated solids from said solution.

In one aspect of the invention preliminary cooling of the solution is provided in a separate step preceding the agglomeration step.

In another aspect of the invention catalyst agglomeration and recovery is carried out in a vessel divided by vertically disposed plates into three vertical compartments. Agglomeration is carried out in the first compartment, flocculated catalyst rising to the top of this compartment. The catalyst is then moved up an inclined plane by a revolving rake and deposited in a second compartment. The polymer solution which remains after removal of the catalyst, passes through a screen at the top of the first compartment and overflows into the third compartment. Withdrawal of agglomerated catalyst and solution is then effected from the second and third compartments.

This invention is applicable in general to the treatment of olefin polymers such as, for example, homopolymers or copolymers of monoolefins like ethylene, propylene, 1-butylene, etc.; also, copolymers of monoolefins and diolefins, such as 1,3-butadiene, isoprene, etc. These polymers are prepared usually by contacting the olefin to be polymerized with a catalyst in the presence of a solvent or diluent material at an elevated temperature and pressure. A number of catalytic materials can be used for the purpose of polymerizing olefins, the most desirable being chromium oxide, preferably containing hexavalent chromium, with silica, alumina, zirconia, thoria, silica-alumina, etc. These catalysts can be prepared, for example, by containing soluble salts of chromium with silica, alumina, thoria, etc., for a sufficient period of time to impregnate the latter material. Following this, excess liquid is removed, for example, by filtering after which the solid catalysts are dried and activated at temperatures in the range of 450° F. to 1500° F. under non-reducing conditions (e.g., in anhydrous air) for several hours. For a detailed discussion of the catalysts, their composition and their methods of preparation, reference can be had to the copending application of Hogan and Banks, Serial No. 573,877, filed March 26, 1956, now U.S. Patent 2,825,721 (March 4, 1958) wherein the catalysts are discussed in detail. These and other solid catalysts or catalysts containing a solid component can be treated in the method of this invention.

The temperature required for polymerizing olefins varies over a wide range. However, usually it is preferred to carry out the reaction at a temperature between about 150° F. and about 450° F. The particular temperature to be employed in each individual case depends on the catalyst used, the olefin to be polymerized and the operating conditions employed, such as pressure, space velocity, diluent to olefin ratio, etc.

The polymerization pressure usually is maintained at a sufficient level to assure a liquid phase reaction, that is, at least about 100 to 300 p.s.i.g., depending upon the type of feed material and the polymerization temperature. Higher pressure up to 500 to 700 p.s.i.g. or higher can be used, if desired. The catalyst concentration in the reactor usually varies from between about 0.01 and about 10 percent by weight and generally, it is desirable to provide a reactant residence time of between about 15 minutes and about 12 hours.

The use of a diluent in the polymerization reaction in general serves two purposes. Since the reactions are usually exothermic in nature, the presence of a quantity of diluent provides a method for obtaining close control of the reaction temperature. In addition, as previously stated, polymers formed in the reaction or a portion thereof may be tacky in nature and, if this is the case, the presence of a diluent tends to prevent adherence of the polymer to the walls of the reaction vessel and the recovery equipment which is used in treating the effluent from the polymerization reaction. In general, the quantity of diluent is large relative to the olefin feed material. Usually, the olefin constitutes between about 0.1 and about 25 percent by volume of the mixture and preferably between about 2 and about 15 percent by volume.

The solvent or diluent employed in the polymerization reaction includes in general, paraffin hydrocarbons. Among the more useful solvents are acyclic hydrocarbons having between about 3 and about 12 carbon atoms per molecule, such as, for example, propane, isobutane, n-pentane, isopentane, isooctane, etc., and preferably those acyclic paraffins having 5 to 12 carbon atoms per molecule. Also useful in the polymerization reaction are alicyclic hydrocarbons, such as cyclohexane, methylcyclohexane, etc. Aromatic diluents can also be used; however, in some instances they (or impurities therein) tend to shorten the catalyst life, therefore, their use will depend on the importance of catalyst life. All of the foregoing and in addition, other hydrocarbon diluents which are relatively inert and in the liquid state at the reaction conditions can also be employed in carrying out the reaction of olefins to form solid polymers.

Although the invention is applicable to polymerization systems in general, it finds particular use in processes for the polymerization of 1-olefins having a maximum of 8 carbon atoms per molecule and no branching nearer the double bond than the 4-position; and more particularly in processes for the polymerization of ethylene under conditions which provide polymers of ethylene which have a density of at least 0.94 and preferably 0.96 or higher and a crystallinity of at least 70 percent and preferably at least 80 percent at normal atmospheric temperatures. While the polymerization of ethylene provides a preferred embodiment of the invention, it is not intended that the scope of the invention be limited thereby but that any of the other processes described are also within the invention.

One method of preparing polymers of olefins is described in detail in a copending application of Hogan and Banks, Serial No. 573,877, filed March 26, 1956, now U.S. Patent 2,825,721 (March 4, 1958). This particular method utilizes a chromium oxide catalyst, preferably containing hexavalent chromium, with silica, alumina, silica-alumina, zirconia, thoria, etc. In the method of the Hogan et al. application, olefins are polymerized in the presence of a hydrocarbon diluent, for example, an acyclic, or aromatic compound which is inert and in which the formed polymer is soluble. The reaction is ordinarily carried out at a temperature between about 150° F. and about 450° F. and under a pressure sufficient to maintain the reactant and diluent substantially in the liquid state. The polymers produced by this method, particularly the polymers of ethylene, are characterized by having an unsaturation which is principally either trans-internal or terminal vinyl, depending on the particular process conditions employed. When low reaction temperatures, about 150° F. to about 320° F., and a mobile catalyst are used for polymerization, the product polymer is predominantly terminal vinyl in structure. When polymerization is carried out at higher temperatures and a fixed catalyst bed, the polymer has predominantly trans-internal unsaturation. Polymers prepared by both methods are also characterized by their high densities and high percentage of crystallinity at normal atmospheric temperature.

In carrying out the invention in its broad aspect a polymer solution, for example a solution of solid ethylene polymer in cyclohexane, containing subdivided solids, for example chromium oxide catalyst, containing hexavalent chromium associated with silica-alumina, is reduced from solution temperature to a lower temperature whereby the catalyst agglomerates. Cooling is effected by autorefrigeration, namely by reducing the pressure on the solution whereby solvent vaporizes from the solution, thus providing a cooling and reduction in temperature of the solution and solids contained therein. Normally the agglomerated solids, having a greater density than the solution, would settle to the bottom of the agglomeration zone. However, due to the physical nature of the autorefrigeration process, specifically due to vaporization and release of gases throughout the polymer solution, the buoyancy of the agglomerated solids is increased to the point where these solids rise instead to the surface of the solution. It is then possible to separate the agglomerated solids from the solution by a suitable mechanical operation, such as, by skimming or sweeping the surface of the solution. It is also possible to use non-mechanical aids for the separation, such as, a stream of gas or liquid directed against the solids, or the like.

When preparing olefin polymers using the methods and catalysts previously described, a portion of the olefin feed is often converted to heavy polymers of substantially higher molecular weight than the desired polymer product. These heavy polymers which are almost insoluble in the diluent (and at the temperatures) employed in the polymerization reaction frequently become associated with the catalyst solids. It is not unusual for the catalyst to pass through the entire catalyst recovery system and emerge contaminated with substantial quantities of the heavy polymers. For example, in the polymerization of ethylene using the method and catalysts of Hogan and Banks Patent No. 2,825,721 the recovered catalysts can contain from about 25 percent to about 80 percent of polymer by weight. Similar high concentration of heavy substantially insoluble polymer, associated with the polymerization catalyst, are encountered in systems employing other feed materials, catalysts and different reaction conditions.

Although the mechanism of solids agglomeration, within the scope of this invention, is not clearly understood it is believed that an important factor is the heavy polymer associated with the catalyst solids. It is believed that the changes in temperature which bring about agglomeration effect changes in the polymer properties whereby the particles of solids become adherent to each other and thus form agglomerates.

It is known that precipitation of soluble polymer from solution aids in the agglomeration, however, agglomeration does occur without appreciable polymer precipitation; therefore, this does not appear to be an essential feature of the agglomeration process.

The temperature range over which agglomeration of the solids contained in the solution occurs, varies depending on the particular polymer associated with the catalyst, the presence or absence of dissolved polymer (in any substantial quantities) and the solvent employed. For example when treating an ethylene polymer dissolved in cyclohexane agglomeration usually begins in the temperature range between about 230° and about 200° F. and is substantially completed when the temperature reaches between about 210° F. and about 190° F. When treating other solutions of polymers dissolved in the various solvents which are employed in carrying out the polymerization reaction, the agglomeration temperatures can vary over a relatively wider range, such as, from about 300° F. to about 200° F. at the beginning of agglomeration and between about 250° F. and 200° F. when agglomeration is complete. In any individual case the precise temperatures employed depend on the particular polymer and solvent being treated.

In accordance with one embodiment of the invention precooling of the polymer solution is provided down to a temperature level just above the temperature at which agglomeration of the solids begins to take place. The principal advantage in this method of operation is that it minimizes foaming and liquid carry-over during the agglomeration operation. Thus, when simultaneously agglomerating solids and precipitating soluble polymer, it has been found desirable to carry out the major portion of the polymer solution cooling in a separate zone from that in which agglomeration of the catalyst takes place in order to prevent excessive turbulence, vapor velocity, etc., and to assure accumulation of agglomerates at the desired level, namely, at the surface of the polymer solution. Conveniently the precooling is carried out in a similar manner to the agglomeration step namely by the use of autorefrigeration, whereby a common condensing and vacuum system can accommodate both steps of the process. It is within the scope of the invention, however, to provide the preliminary cooling by other methods, such as, by indirect heat exchange, by adding cold solvent to the polymer solution, etc. In the use of any of the different precooling methods mechanical or other agitation can be provided as desired, since there is no precipitated polymer present to hinder operation of the agitation equipment.

Figures 2, 3:
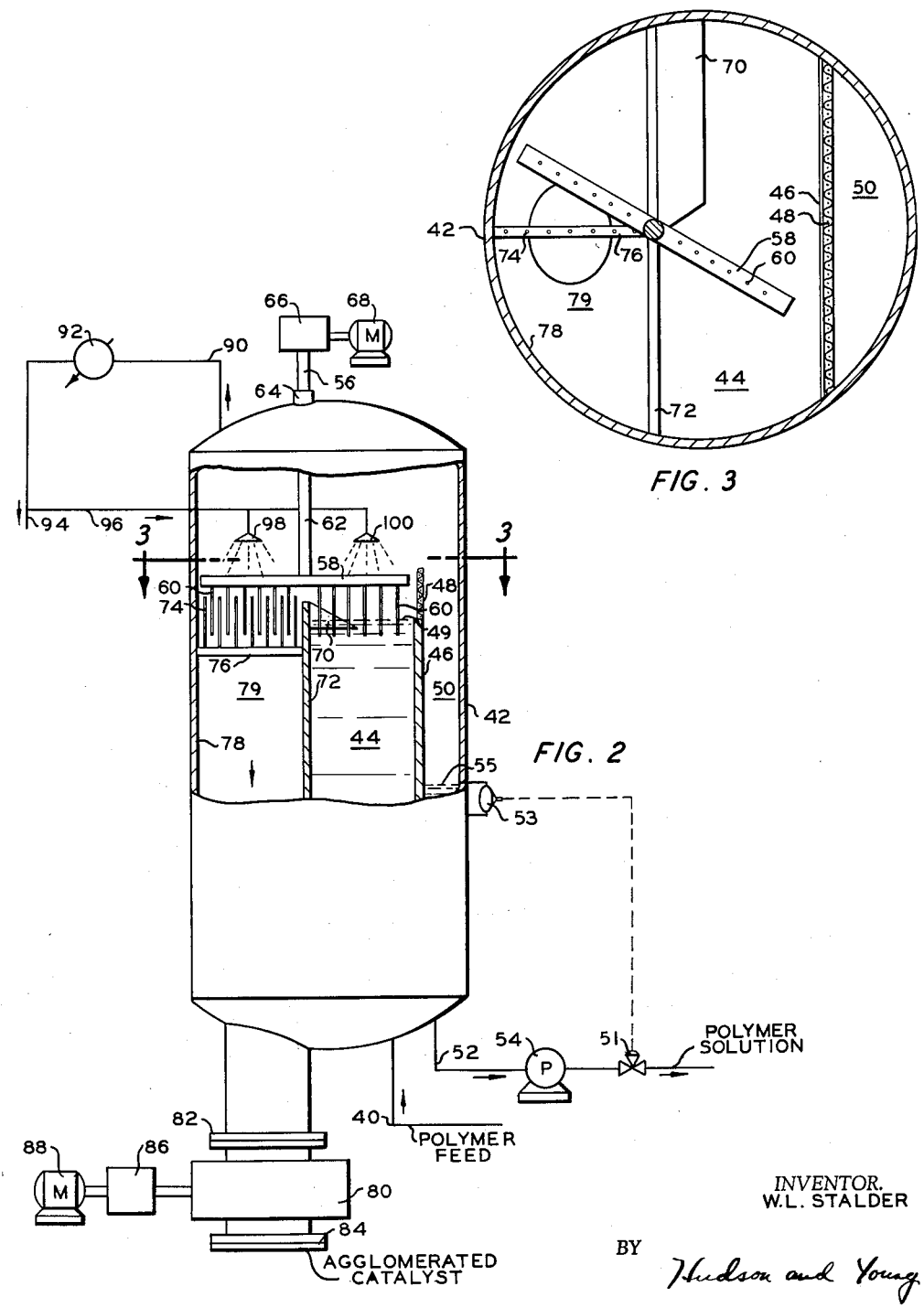

In order to more clearly describe the invention and provide a better understanding thereof reference is had to the accompanying drawings of which, FIGURE 1 is a diagrammatic illustration of a polymerization reactor, an ethylene removal vessel and apparatus for carrying out the aforedescribed two step precooling and agglomeration method of this invention, and FIGURE 2 is a front view in cross section of a preferred apparatus for carrying out the invention and FIGURE 3 is a top view through section AA of the apparatus of FIGURE 2.

Referring to FIGURE 1, ethylene, cyclohexane diluent and chromium oxide catalyst are introduced to reactor 5 through conduits 2, 3 and 4 respectively. For ease of handling, the catalyst is slurried in cyclohexane before it is introduced to the reactor. During polymerization the material in the reactor is maintained in a highly agitated state by means of a mechanical mixer or other conventional mixing means (not shown). The reaction is carried out at a temperature of about 285° F. and a pressure of about 500 p.s.i.a. and for a sufficient time to convert a portion of the ethylene feed to solid ethylene polymer (at atmospheric temperatures). Reaction effluent leaves the reactor through conduit 6 and enters a separation zone 7 wherein a stream comprising principally unconverted ethylene and some solvent is separated and returned to the reactor through conduit 8 and cooler 9. Following this step, the effluent is combined with additional solvent introduced through conduit 10. The mixture comprising a solution of solid ethylene polymer in cyclohexane containing subdivided catalyst is then introduced to precooling vessel 15. Within this vessel there is maintained a body of polymer solution which is agitated by mixer 16 driven by motor 17. Cooling is provided by withdrawing vapors overhead from the precooling vessel through conduit 18 and condenser 19. Sufficient vaporization takes place in the precooling vessel to provide a reduction in temperature to just above the level where catalyst agglomeration begins to take place. The cooled polymer solution and solid catalyst contained therein pass from the bottom of vessel 15 through conduit 21 and pump 22 and enter the bottom of agglomeration vessel 24. Another body of polymer solution 26 is maintained in this vessel, however in this instance, the temperature of the solution is such that polymer precipitates therefrom and the catalyst particles agglomerate. Cooling in this vessel is also provided by removal of vapors overhead, through conduit 34 and condenser 36. A portion of the condensate from the two overhead condensers 19 and 36 is returned to the vessel 24 in the form of a liquid spray to minimize foaming and also to maintain the concentration of polymer in solvent in this vessel. Any solvent not returned to the agglomeration vessel can be removed from the system through conduit 20.

The nature of the autorefrigeration cooling method is such that vaporization takes place substantially throughout the polymer solution 26. As a result there is a continuous upward flow of vapors through the liquid within this vessel. The buoyancy effect which results from this vapor flow is sufficient to carry the agglomerated particles, which are actually of a greater density than the polymer solution, to the top level of said solution. From this point the accumlated solids are withdrawn by suitable means, such as, by skimming or raking, and yielded from the unit through conduit 28. Since some solid and a substantial amount of polymer is associated with the agglomerated catalyst, additional processing steps (not shown) are usually provided for the separation and the recovery of these materials as desired.

Although FIGURE 2 exemplifies a preferred embodiment of this invention, wherein a two stage process is employed, it is also possible as shown in the drawing to bypass the precooling vessel with the polymer feed by going through conduit 13 and thus carry out the entire cooling process in the agglomeration vessel.

In FIGURE 2 there is illustrated a preferred apparatus for carrying out the invention comprising a vertical confined vessel 42 containing two parallel dividing plates 72 and 46 disposed vertically in said vessel and sealed to the inner walls and bottom thereof. These plates, of which 72 is at the higher elevation, terminate below the top of vessel 42 and thus divide said vessel into three vertical compartments 50, 44, and 79 respectively. Disposed above dividing plate 72 is a horizontal arm 58 which rotates in a horizontal plane around vertical shaft 62, the axis of which lies directly above plate 72. Shaft 62 is driven from gear box 66 which is motivated by motor 68, both gear box and motor being located outside of vessel 42. A sealing gasket 64 is provided around shaft 62 whereby this shaft is held in place in the vertical plane and a vapor seal is provided. Associated with divider 72 is member 70 which forms an inclined plane, the lower edge of which is disposed in the middle compartment below liquid level 49 and the upper edge of said plane terminates at the top of divider 72. Extending from the bottom of horizontal arm 58 are vertical prongs which are evenly spaced along the length of said arm. Means are provided for rotating horizontal arm 58 in a plane perpendicular to the horizontal whereby prongs 60 are deflected from the vertical during the passage of said prongs up inclined plane 70 and over parallel divider 72, and also during passage of prongs 60 in the opposite direction from compartment 79 over divider 72 into compartment 44. A series of similar prongs are attached to a fixed horizontal arm 76 disposed perpendicular to plate 72 in compartment 79, said prongs extending vertically and being attached to the top of arm 76. Prongs 74 are so spaced that as horizontal arm 58 rotates past these prongs each of prongs 60 passes between two prongs 74, the latter prongs being so spaced that the free space between each fixed and moving prong is substantially the same.

Associated with plate 46, which forms a weir to provide liquid level 49, is a screen member 48 which extends above plate 46, and in effect forms an extension of said plate.

Conduit means 40 is provided in the bottom of vessel 42 for the introduction of polymer feed and a second conduit means 52, which forms the suction of pump 54, is provided in the bottom of compartment 50 for the withdrawal of polymer solution. Control of liquid level 55 in compartment 50 is provided by controller 53 which actuates control valve 51 disposed in the discharge line of pump 54. In the upper portion of vessel 52 conduit means 90 is provided for the removal of solvent vapors. Means are also provided to condense said vapors and return a portion of said vapors to vessel 42 through conduit 96 and sprays 98 and 100. In the bottom portion of compartment 79 there is provided a self-cleaning air lock 80 which is actuated through gear box 86 by motor 88. Air lock 80 is flanged to the outlet from vessel 42 for easy removal.

A top view of vessel 42 through section AA also forms FIGURE 3 of the drawings. In this view can be seen vertical plates 46 and 72, inclined plane 70, horizontal arm 58 containing prongs 60 and stationary horizontal arm 76 containing prongs 74.

In the operation of the apparatus of FIGURES 2 and 3 a polymer solution similar to that employed in the process of FIGURE 1 is introduced to vessel 42 and compartment 44 through conduit 40. The solution rises in compartment 44 to a level 49 after which it overflows plate 46 into compartment 50. The temperature of the solution while in compartment 44 is reduced by vaporization of solvent to provide precipitation of polymer from the solution and agglomeration of the catalyst solids. Through the buoyancy effect of the vapors passing upward through the liquid the normally heavier agglomerates rise through the solution and accumulate at the upper level 49. The agglomerates are picked up by prongs 60 attached to horizontal arm 58 which rotates continuously about shaft 62. As the prongs pass through compartment 44 they engage agglomerated catalyst, pushing said catalyst along through the compartment upwardly along inclined plane 70 and over plate 72 into compartment 78. Any agglomerated catalyst which adheres to prongs 60 is removed therefrom when these prongs pass adjacent to stationary prongs 74 in compartment 79. Agglomerated catalyst falls downwardly through compartment 79 being withdrawn through air-lock valve 80. As desired further treatment of the agglomerated catalyst (not shown) can be provided to effect recovery of solvent and if desired a portion of the polymer associated with the catalyst.

Vaporization of solvent from the polymer solution in compartment 44 is provided by reducing the pressure on vessel 42, solvent vapors being withdrawn overhead from vessel 42 through conduit 90 and condenser 92. A portion of the condensed material is returned to vessel 42 through conduit 96 and sprays 98 and 100 whereby foaming is held to a minimum. Any condensed solvent which is not returned to vessel 42 can be yielded through conduit 94. Polymer solution free from agglomerated catalyst overflows plate 46 through screen 48 and into compartment 50. This material is withdrawn from compartment 50 through conduit 52 and pump 54. Liquid level 55 is maintained, as previously described, by a suitable liquid level apparatus. Polymer solution discharged from vessel 42 can also be further treated as desired for the recovery of dry polymer and solvent.

The preceding embodiment of the invention has been directed to preferred method and apparatus for carrying out the invention. However, it is not intended that this in any way limit the scope of the invention. Thus, it is within the scope of the invention to vary the methods and apparatus employed in carrying out the invention as long as the essential feature of cooling and agglomerating solids by autorefrigeration is employed. For example, as previously stated where a precooling step is used, it is within the scope of the invention to carry out such precooling by any conventional means, including auto-refrigeration, direct or indirect heat exchange, etc. Although the preceding embodiment has illustrated the operation of the invention in a continuous manner, it is also within the scope of the invention to carry out solids agglomeration and removal from a polymer solution by batchwise operation.

The following data is presented in illustration of the invention in a preferred embodiment thereof.

*Example*

A solid polymer of ethylene was prepared in the presence of a catalyst comprising 2.5 percent by weight of chromium as chromium oxide, containing 2.2 percent hexavalent chromium, with silica-alumina (weight ratio is 9:1), prepared by impregnating silica-alumina with an aqueous solution (1M) of chromium trioxide, followed by drying and activation in dry air at gradually increasing temperatures up to 950° F.

A sample of the polymer product comprising by weight 4.89% polymer, 6.24 percent catalyst and 88.87 percent cyclohexane was introduced to a feed tank and from there passed into a flocculating chamber disposed in an oil bath. After filling the pressure on the flocculating chamber was gradually decreased whereby the polymer solution was cooled, polymer precipitated from solution and the catalyst was agglomerated. The following conditions obtained during this operation:

| Time, p.m. | Feed Rate, g.p.m. | Temperatures, °F. | | | Pressures, p.s.i.g. | |
|---|---|---|---|---|---|---|
| | | Oil Jacket | Feed Tank | Flocculating Chamber | Feed Tank | Flocculating Chamber |
| 1:15 | 0.40 | 231 | 255 | 215 | 70 | 9.50 |
| 1:18 | 0.35 | 222 | 245 | 214 | 70 | 10.75 |
| 1:20 | | 220 | 245 | 203 | 70 | |
| 1:22 | | 190 | 240 | 200 | 70 | |
| 1:24 | | 182 | 240 | 200 | 70 | |
| 1:37 | | | | 180 | | |

As the temperature of the polymer solution in the flocculating chamber dropped below 214° F. agglomeration of the catalyst began to take place and by the time the temperature reached 200° F. the solution which before had been cloudy became quite clear. The agglomerates did not settle in the polymers solution but accumulated on top of the liquid.

Having thus described the invention by providing specific example thereof it is to be understood that no undue limitations or restrictions are to be drawn by reason thereof and that many modifications and variations are within the scope of the invention.

I claim:
1. A process for recovering catalyst solids from a solution of solid ethylene polymers which comprises introducing the polymer solution to a first zone, reducing the temperature of the solution in said zone to between about 230° F. and about 200° F., passing the cooled solution to a second zone, reducing the solution temperature in the second zone by autorefrigeration to between about 210° F. and about 190° F. whereby polymer precipitates from solution thereby agglomerating the catalyst solids and the agglomerates rise to the surface of said solution and separating the catalyst agglomerates from the polymer solution.

2. The process of claim 1 in which the solids comprise chromium oxide containing hexavalent chromium associated with silica-alumina.

3. The process of claim 1 wherein the temperature reduction in the first zone is provided by autorefrigeration.

4. The process of claim 1 in which agitation is provided in the first zone during the cooling process.

5. A process, for recovering catalyst solids from a solution of ethylene polymer, which process comprises introducing said solution into a cooling zone, reducing the temperature of said solution in said zone to between about 230° F. and about 190° F. by autorefrigeration whereby polymer precipitates from solution thereby agglomerating said solids and the agglomerated solids rise to the surface of said solution, and separating the agglomerated solids from the polymer solution.

6. A process, for recovering catalyst solids from a solution of normally solid polymer of a 1-olefin having from 2 to 8 carbon atoms per molecule and no branching nearer the double bond than the 4-position in a solvent selected from the group consisting of aromatic hydrocarbons, alicyclic hydrocarbons and paraffin hydrocarbons having from 3 to 12 carbon atoms per molecule, which process comprises introducing said solution into a cooling zone, reducing the temperature of said solution in said zone to between about 230° F. and about 190° F. by autorefrigeration whereby polymer precipitates from solution thereby agglomerating said solids and the agglomerated solids rise to the surface of said solution, and separating the agglomerated solids from the polymer solution.

References Cited in the file of this patent

UNITED STATES PATENTS

| | | |
|---|---|---|
| 867,958 | Dorr | Oct. 15, 1907 |
| 871,046 | Savage | Nov. 12, 1907 |
| 1,007,954 | Lamb | Nov. 7, 1911 |
| 1,102,738 | Greenway et al. | July 7, 1914 |
| 1,709,329 | Terry | Apr. 16, 1929 |
| 1,887,490 | Imhoff | Nov. 15, 1932 |
| 2,702,288 | Hoeksema et al. | Feb. 15, 1955 |
| 2,728,753 | Russum | Dec. 27, 1955 |
| 2,728,754 | Evering | Dec. 27, 1955 |
| 2,759,607 | Boyd et al. | Apr. 21, 1956 |
| 2,858,902 | Cottle | Nov. 4, 1958 |